(12) United States Patent
Satomi (10) Patent No.: US 11,990,149 B2
(45) Date of Patent: May 21, 2024

(54) ECHO SUPPRESSION DEVICE, ECHO SUPPRESSION METHOD, AND ECHO SUPPRESSION PROGRAM

(71) Applicant: TRANSTRON INC., Yokohama (JP)

(72) Inventor: Yuki Satomi, Yokohama (JP)

(73) Assignee: TRANSTRON INC., Yokohama (JP)

( * ) Notice: Subject to any disclaimer, the term of this patent is extended or adjusted under 35 U.S.C. 154(b) by 448 days.

(21) Appl. No.: 17/437,665

(22) PCT Filed: Mar. 17, 2020

(86) PCT No.: PCT/JP2020/011726
§ 371 (c)(1),
(2) Date: Sep. 9, 2021

(87) PCT Pub. No.: WO2020/203258
PCT Pub. Date: Oct. 8, 2020

(65) Prior Publication Data
US 2022/0165286 A1 May 26, 2022

(30) Foreign Application Priority Data
Apr. 5, 2019 (JP) .................. 2019-072738

(51) Int. Cl.
*H04B 15/00* (2006.01)
*G10L 21/0208* (2013.01)
*H04B 3/23* (2006.01)

(52) U.S. Cl.
CPC .......... *G10L 21/0208* (2013.01); *H04B 3/234* (2013.01); *G10L 2021/02082* (2013.01)

(58) Field of Classification Search
CPC ................ H04B 3/234; G10L 21/0208; G10L 2021/02082; G10L 21/02; H04M 9/082; H04L 43/50; G10K 11/17883
(Continued)

(56) References Cited

U.S. PATENT DOCUMENTS 5,384,853 A * 1/1995 Kinoshita ........ G10K 11/17883
381/71.12
8,660,676 B2 * 2/2014 Aichner ................ H04M 9/082
700/94
(Continued)

FOREIGN PATENT DOCUMENTS

| JP | 2013-187810 A | 9/2013 |
| JP | 2018-201147 A | 12/2018 |
| WO | 2015/080927 A1 | 6/2016 |

OTHER PUBLICATIONS

PCT/ISA/210, "International Search Report for International Application No. PCT/JP2020/011726," Jun. 9, 2020.
(Continued)

*Primary Examiner* — Md S Elahee
(74) *Attorney, Agent, or Firm* — HAUPTMAN HAM, LLP (57) ABSTRACT

A non-linear echo is allowed to be suppressed and voice deterioration is allowed to be suppressed. An echo suppression device for suppressing an echo generated by inputting a voice signal output from a speaker to a microphone includes a compressor on a receiving signal path for transmitting a signal of a receiving signal to the speaker. When a double-talk state has been detected, the compressor performs a compression process on a signal greater than a first threshold among the receiving signals.

9 Claims, 8 Drawing Sheets

(58) Field of Classification Search
USPC .......................................................... 381/94.1
See application file for complete search history.

(56) References Cited

U.S. PATENT DOCUMENTS

| | | | |
|---|---|---|---|
| 9,203,730 B1* | 12/2015 | Johnson | .................. H04L 43/50 |
| 11,039,245 B2 | 6/2021 | Satomi | |
| 2004/0120271 A1 | 6/2004 | Lablanc | |
| 2012/0307980 A1 | 12/2012 | Krishnaswany | |
| 2014/0278397 A1* | 9/2014 | Chen | ........................ G10L 21/02 |
| | | | 704/233 |
| 2015/0011266 A1 | 1/2015 | Feldt et al. | |
| 2015/0030168 A1 | 1/2015 | Schulz et al. | |
| 2015/0154977 A1 | 6/2015 | Ekman et al. | |
| 2016/0127561 A1 | 5/2016 | Mani et al. | |

OTHER PUBLICATIONS

European Patent Office "Extended European Search Report for European Patent Application No. 20783377.3," Apr. 25, 2022.

\* cited by examiner

ECHO SUPPRESSION DEVICE, ECHO SUPPRESSION METHOD, AND ECHO SUPPRESSION PROGRAM

RELATED APPLICATIONS

The present application is National Phase of International Application No. PCT/JP2020/011726 filed Mar. 17, 2020, and claims priority from Japanese Application No. 2019-072738, filed Apr. 5, 2019, the disclosure of which is hereby incorporated by reference herein in its entirety.

TECHNICAL FIELD

The present invention relates to an echo suppression device, an echo suppression method, and an echo suppression program.

BACKGROUND ART

Patent Document 1 discloses an echo suppression device that, in a case of detecting that no signal is being transmitted through a transmitting signal path and that a signal is being transmitted through a receiving signal path, an echo suppressor is used to perform a process of suppressing an echo in a picked-up sound signal.

CITATION LIST

Patent Literature

Patent Document 1: JP 2018-201147 A

SUMMARY OF INVENTION

Technical Problem

However, with the echo suppression device described in Patent Document 1, in a case where performance of a speaker or a speaker amplifier is low, there is a possibility that non-linear echoes increase, uncancelled echoes increase, and a quality of a conversational voice is deteriorated.

The present invention has been made in light of the foregoing, and an object of the present invention is to provide an echo suppression device, an echo suppression method, and an echo suppression program that allow suppressing a non-linear echo and reducing voice deterioration.

Solution to Problem

In order to solve the problem, an echo suppression device according to the present invention is, for example, an echo suppression device for suppressing an echo generated by inputting a voice signal output from a speaker to a microphone. The echo suppression device includes a level adjustment unit, an echo removal unit, and a double-talk detection unit. The level adjustment unit is provided on a receiving signal path for transmitting a signal of receiving signals from a far-end side to the speaker. The echo removal unit is provided on a transmitting signal path for transmitting a signal input from the microphone. The echo removal unit removes a residual echo from a picked-up sound signal output from the microphone. The double-talk detection unit detects whether signals are in a double-talk state in which the signals are simultaneously transmitted to the transmitting signal path and the receiving signal path. The level adjustment unit includes a compressor. When the double-talk detection unit has detected the double-talk state, the compressor performs a compression process on a signal greater than a first threshold among the receiving signals. When the double-talk detection unit has not detected the double-talk state, the compressor performs the compression process on a signal greater than a second threshold greater than the first threshold among the receiving signals.

The echo suppression device according to the present invention includes the compressor on the receiving signal path for transmitting the signal of the receiving signal to the speaker. When the double-talk state has been detected, the compressor performs the compression process on the signal greater than the first threshold among the receiving signals from the far-end side. Thus, a non-linear echo can be prevented. As a result, voice deterioration can be reduced.

Here, when the double-talk detection unit has not detected that the signal is in the double-talk state, the compressor may perform the compression process on the signal greater than the second threshold greater than the first threshold among the receiving signals. This allows more reliably preventing the non-linear echo.

Here, the level adjustment unit may include a gain adjustment unit that adjusts a gain of the receiving signal. The compressor may adjust the threshold so that the first threshold becomes small as the gain increases. The compressor may perform a process on a signal output from the gain adjustment unit. As a result, even when the gain adjustment unit outputs a large voice signal, the compressor reduces a peak of the voice signal, and thus the non-linear echo can be reduced.

Here, the compressor may increase compressibility as the gain increases. As a result, even when the gain adjustment unit outputs a large voice signal, the compressor reduces the peak of the voice signal, and thus the non-linear echo can be reduced.

Here, the compressor may change compressibility based on information on a distortion of the speaker. This allows reducing the non-linear echo.

Here, an echo suppressor that performs a process to suppress an echo on a signal from which the residual echo has been removed by the echo removal unit may be further provided. As a result, even when a sound volume of the speaker is set to be large due to a large noise in an external environment or the like and the non-linear echoes are generated many, an echo component can be removed.

Here, the compressor may compare a value of the receiving signal with a third threshold for each frequency band. When the double-talk detection unit has detected the double-talk state, the compressor may perform the compression process on a signal of the receiving signal having a value greater than the third threshold. Accordingly, a proportion of the signals compressed by compressor is reduced to produce a further natural voice, and thus a telephone call quality can be improved.

In order to solve the problem, an echo suppression method according to the present invention is, for example, an echo suppression method for suppressing an echo in a near-end terminal including a speaker and a microphone. The echo suppression method includes: detecting whether signals are in a double-talk state in which the signals are simultaneously transmitted to a transmitting signal path for transmitting a signal input from the microphone and a receiving signal path for transmitting a signal to the speaker; performing a compression process on a signal greater than a first threshold among receiving signals from a far-end side when the double-talk state has been detected; outputting a signal after the compression process from the speaker; and removing a residual echo from a picked-up sound signal output from the microphone. As a result, the non-linear echo is allowed to be suppressed and the voice deterioration is allowed to be suppressed.

In order to solve the problem, an echo suppression program according to the present invention is, for example, an echo suppression program for suppressing an echo in a near-end terminal including a speaker and a microphone. The echo suppression program causes a computer to function as: a double-talk detection unit that detects whether signals are in a double-talk state in which the signals are simultaneously transmitted to a transmitting signal path for transmitting a signal input from the microphone and a receiving signal path for transmitting a signal to the speaker; a compressor that performs a compression process on a signal greater than a first threshold among receiving signals from a far-end side when the double-talk state has been detected; and an echo removal unit that removes a residual echo from a picked-up sound signal output from the microphone. As a result, the non-linear echo can be suppressed and the voice deterioration can be reduced.

Advantageous Effects of Invention

According to the present invention, the non-linear echo can be suppressed and the voice deterioration can be reduced.

DESCRIPTION OF EMBODIMENTS

Embodiments of an echo suppression device according to the present invention will be described below in detail with reference to the drawings. An echo suppression device is a device suppressing echo generated during a telephone call in a voice communication system.

First Embodiment

Figure 1:
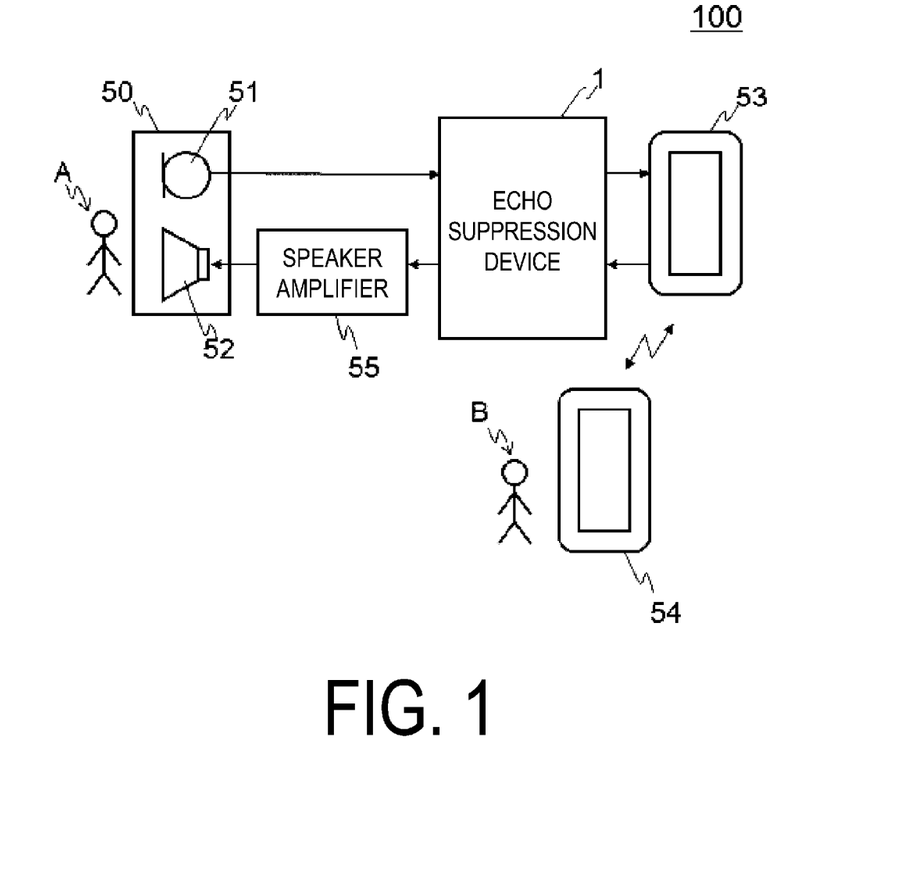
FIG. 1 is a diagram schematically illustrating a voice communication system 100 provided with an echo suppression device 1 according to a first embodiment.

FIG. 1 is a diagram schematically illustrating a voice communication system 100 provided with an echo suppression device 1 according to the first embodiment. The voice communication system 100 primarily includes a terminal 50 including a microphone 51 and a speaker 52, two cell phones 53 and 54, a speaker amplifier 55, and the echo suppression device 1.

The voice communication system 100 is a system in which a user (a user A on a near-end side) utilizing the terminal 50 (near-end terminal) is in voice communication with a user (user B on a far-end side) utilizing the cell phone 54 (far-end terminal). A voice signal input via the cell phone 54 is amplified and output by the speaker 52, and a voice emitted by the user on the near-end side is collected by the microphone 51 and transmitted to the cell phone 54. Thus, the user A can make an amplified voice call (hands-free call) without holding the cell phone 53. The cell phone 53 and the cell phone 54 are connected together by a common telephone line.

The echo suppression device 1 suppresses echoes generated when the voice signals output from the speaker 52 are input to the microphone 51. The echo suppression device 1 is provided between the terminal 50 and the cell phone 53, that is, on a transmitting signal path for transmitting a picked-up sound signal input via the microphone 51 from the microphone 51 to the cell phone 53 and on a receiving signal path for transmitting a receiving signal from the cell phone 54 on the far-end side from the cell phone 53 to the speaker 52.

The echo suppression device 1 may be configured as a dedicated board mounted on a speech terminal or the like (for example, an on-board device, a conference system, or a mobile terminal) in the voice communication system 100. Additionally, the echo suppression device 1 may include, for example, computer hardware and software (echo suppression program). The echo suppression program may be stored in advance in, for example, a HDD as a storage medium built into a device, such as a computer, and a ROM in a microcomputer including a CPU, and may be installed from it into a computer. Additionally, the echo suppression program may be temporarily or permanently stored (memorized) in a removable storage medium such as a semiconductor memory, a memory card, an optical disc, a magneto-optical disk, a magnetic disk, or the like.

Figure 2:
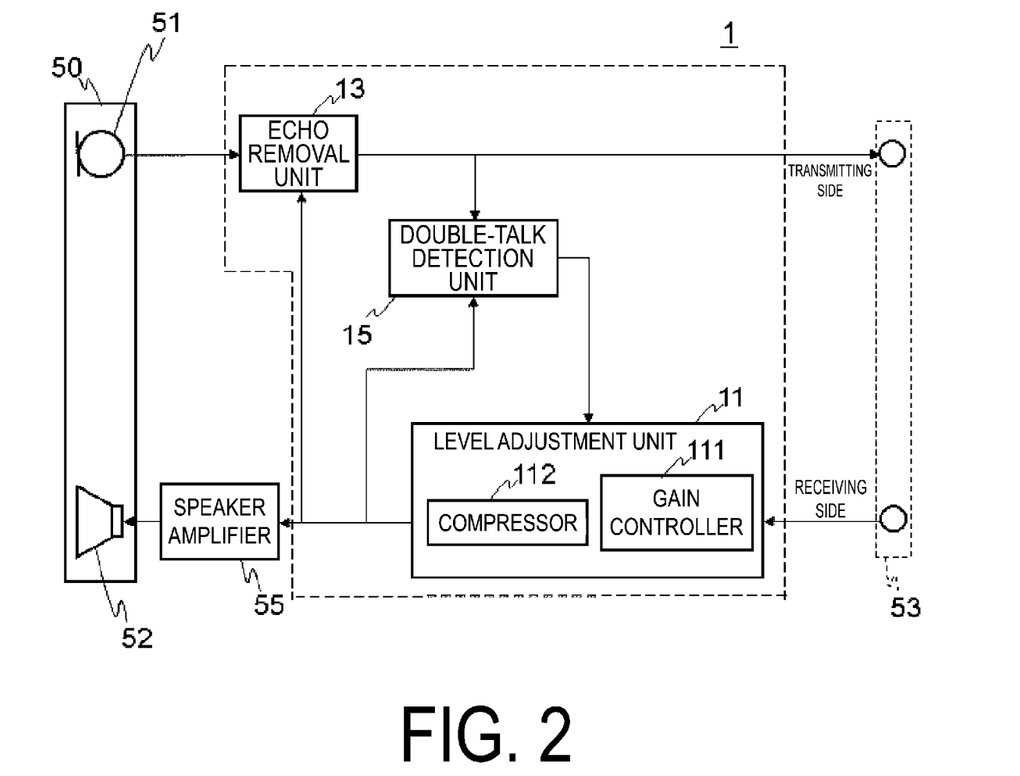
FIG. 2 is a block diagram illustrating a general configuration of the echo suppression device 1.

FIG. 2 is a block diagram illustrating a general configuration of the echo suppression device 1. The echo suppression device 1 primarily includes a level adjustment unit 11, an echo removal unit 13, and a double-talk detection unit 15. In FIG. 2, the upper signal path is the transmitting signal path and the lower signal path is the receiving signal path.

The level adjustment unit 11 is provided on the receiving signal path. The level adjustment unit 11 primarily includes a gain controller 111 and a compressor 112.

The gain controller 111 is a gain adjustment unit that adjusts a gain of the input receiving signal. Specifically, the gain controller 111 adjusts a level (the gain) of amplifying the input signal to adjust a level (a magnitude) of the signal to be output. The gain controller 111 may automatically change the gain by noise or the like in an environment where the terminal 50 is mounted. Additionally, when an input unit, such as a knob, is operated, the gain controller 111 may change the gain based on the position of the input unit.

The signal output from the gain controller 111 is input to the compressor 112. The compressor 112 amplifies (i.e., compresses) a received signal greater than a threshold among the input receiving signals by a predetermined coefficient (the coefficient is a value smaller than 1) and output the signal. The compressor 112 will be described in detail later.

Note that in the present embodiment, the level adjustment unit 11 includes the gain controller 111 and the compressor 112, but the gain controller 111 is not essential. In the absence of the gain controller 111, the receiving signal transmitted from the cell phone 53 is directly input to the compressor 112, and the compressor 112 only needs to compress the received signal greater than the threshold among the input receiving signals.

The echo removal unit 13 is provided on the transmitting signal path to remove a residual echo from the picked-up sound signal output from the microphone 51. The echo removal unit 13 is a linear echo canceller that removes the residual echo using an adaptive filter. Specifically, the echo removal unit 13 updates a filter coefficient according to a given procedure to generate a pseudo echo signal from a signal transmitted through the receiving signal path, and subtracts the pseudo echo signal from a signal transmitted through the transmitting signal path to remove the residual echo. Note that adaptive filters are well known, and thus description of the adaptive filter is omitted.

Note that in the present embodiment, the adaptive filter is applied to the echo removal unit 13, but the echo removal unit 13 can employ another known echo removal technique.

The signal from which the residual echo has been removed by the echo removal unit 13 is transmitted to the cell phone 53. The signal from which the residual echo has been removed by the echo removal unit 13 is input to the double-talk detection unit 15.

The double-talk detection unit 15 detects whether the voice signal input to the echo suppression device 1 is in a single-talk state or a double-talk state. Here, the single talk refers to a state (a near-end speech or a far-end speech) in which either the user A or the user B emits a voice and a signal is transmitted to either the transmitting signal path or the receiving signal path. The double talk refers to a state (the near-end speech or the far-end speech) in which both the user A and the user B emit voices and signals are simultaneously transmitted to the transmitting signal path and the receiving signal path.

For example, the double-talk detection unit 15 holds a frequency mask generated based on a learning signal. The learning signal is a signal transmitted through the transmitting signal path during one-side speech (the single talk) on the far-end side in which only the sound output from the speaker 52 is input to the microphone 51. The frequency mask obtains the maximum value among values of power spectra of a plurality of the input learning signals.

The double-talk detection unit 15 compares the value of the power spectrum of the picked-up sound signal with the value of the frequency mask for each frequency band. When the number of frequency bands in which the value of the picked-up sound signal exceeds the value of the frequency mask is equal to or more than a constant value, it is detected that a sound is input from the microphone 51 and the signal is transmitted (the near-end speech is present) through the transmitting signal path. The double-talk detection unit 15 compares the value of the power spectrum of the receiving signal with the value of the frequency mask for each frequency band. When the number of frequency bands in which the value of the receiving signal exceeds the value of the frequency mask is equal to or more than a constant value, it is detected that the signal is transmitted (the far-end speech is present) through the receiving signal path.

However, the double-talk detection unit 15 may detect whether the signal is in the single-talk state or the double-talk state using other various known methods.

The compressor 112 will now be described in detail. Results are input from the double-talk detection unit 15 to the compressor 112. The compressor 112 performs different processes depending on whether the signal is in the double-talk state.

Figure 3:
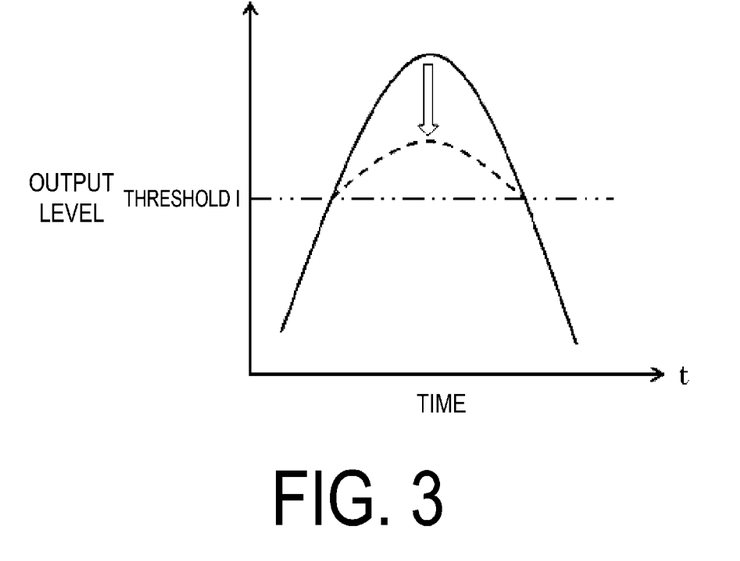
FIG. 3 is a diagram schematically illustrating a process by a compressor when a double-talk state has been detected.

FIG. 3 is a diagram schematically illustrating a process by the compressor 112 when the double-talk state has been detected. When the double-talk detection unit 15 has detected the double-talk state, the compressor 112 performs a compression process on a signal greater than a threshold I among the receiving signals.

Figure 4:
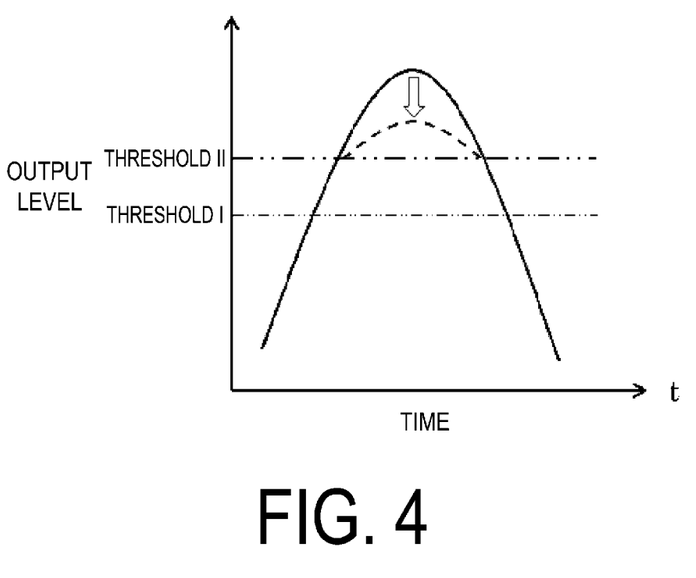
FIG. 4 is a diagram schematically illustrating a process by the compressor when the double-talk state has not been detected.

FIG. 4 is a diagram schematically illustrating a process by the compressor 112 when the double-talk state has not been detected. In a case where the double-talk detection unit 15 has not detected the double-talk state, the compressor 112 performs the compression process on a signal greater than a threshold II among the receiving signals. The threshold II is greater than the threshold I.

In the case of being the double-talk state, an operation by the echo removal unit 13 tends to be unstable. Thus, the threshold I is decreased and the peak of the voice signal output from the speaker 52 is decreased such that the echo removal unit 13 reliably operates. In contrast, when not in the double-talk state, since an uncomfortable feeling is likely to be felt in a voice due to an excessively low peak of the voice signal, the threshold II, which is greater than the threshold I, is used to maintain the quality of the voice.

In FIGS. 3 and 4, the solid line indicates a signal before the compressor 112 performs the compression process, and the dotted line indicates a signal after the compressor 112 performs the compression process. In the compression process, the compressor 112 multiplies the received signal greater than the threshold I or the threshold II among the receiving signals input from the gain controller 111 by the coefficient of 1 or less, which is predetermined for the receiving signal, thus decreasing an output level of the signal.

As a result, a distorted sound generated by largely vibrating the speaker 52, a housing that holds the speaker 52, a component provided in the housing, or the like, can be reduced. In particular, in a case where performance of the speaker 52 or the speaker amplifier 55 is low, the terminal 50 is small, or the like, a distorted sound is likely to be generated due to vibrations of the speaker 52 or the like, but by decreasing the voice level significantly, the distorted sound is reduced.

By reducing the distorted sound at the speaker 52, the signals generated by picking up sounds by the microphone 51 and input to the echo removal unit 13 hardly contain non-linear echoes, and the echo removal unit 13 can sufficiently eliminate the echoes.

Furthermore, the compressor 112 does not perform the compression process on the received signal smaller than the threshold I or the threshold II, and outputs the input signal as is. As a result, an uncomfortable feeling due to a change in sound volume of the speaker 52 and an interruption of a voice is greatly reduced.

According to the present embodiment, performing the compression process on the signal greater than the threshold I or the threshold II allows preventing the non-linear echoes and stabilizing the behavior of the echo removal unit 13. This allows reducing voice deterioration while reducing uncancelled echoes.

In addition, according to the present embodiment, a non-linear echo is less likely to occur, so it is only necessary to provide the echo removal unit 13 that removes a linear echo, and an amount of calculation required to remove echoes can be reduced.

For example, in the absence of the compressor 112, in a case where a non-linear echo is large and the echo is to be cancelled, an echo suppressor is required as in the prior art. Therefore, a large amount of calculation is always required, and the processes are delayed. For example, it is also conceivable to use an echo removal unit using a non-linear adaptive filter, such as a Volterra filter, to cancel the non-linear echoes. However, an enormous amount of calculation (10 times or more than that of a linear echo canceller) is required.

In contrast, according to the present embodiment, by reducing the vibration of the speaker 52 or the like, a difference between the receiving signal received by the receiving side and the voice signal output from the speaker 52 is decreased, thereby ensuring reducing non-linear echoes and sufficiently removing echoes only by the echo removal unit 13, which is a linear echo canceller.

Note that in the present embodiment, when the double-talk state has been detected, the compressor 112 performs the compression process on the receiving signal greater than the threshold I, and when the double-talk state has not been detected, the compression process is performed on the receiving signal greater than the threshold II (greater than the threshold I). However, in the case where the double-talk state has not been detected, performing the compression process on the receiving signal greater than the threshold II is not essential. However, to prevent voice deterioration while reducing non-linear echoes, it is desirable to perform the compression process in both cases where the double-talk state has been detected and the double-talk state has not been detected.

In addition, in the present embodiment, when the double-talk detection unit 15 has detected the double-talk state, the compressor 112 performs the compression process on the signal greater than the threshold I among the receiving signals, but a threshold that is applied in the double-talk state may be varied depending on the situation.

For example, defining the variable threshold as a threshold Iα, the compressor 112 sets the threshold Iα when a gain for amplifying the receiving signal in the gain controller 111 is a certain value (defined as a value a) as a threshold Iα. As the gain becomes greater than the value a, the threshold Iα is set to be smaller than the threshold Iα, and as the gain becomes smaller than the value a, the threshold Iα is set to be greater than the threshold Iα. However, the maximum value of the threshold Iα is set to be smaller than the threshold II. As a result, even when a large voice signal is output from the gain controller 111, non-linear echoes can be reduced by reducing the peak of the voice signal by the compressor 112.

In addition, in the present embodiment, while the coefficient (the value smaller than 1) used by the compressor 112 in the compression process is constant, the coefficient used in the compression process may be varied depending on the situation.

Figure 5:
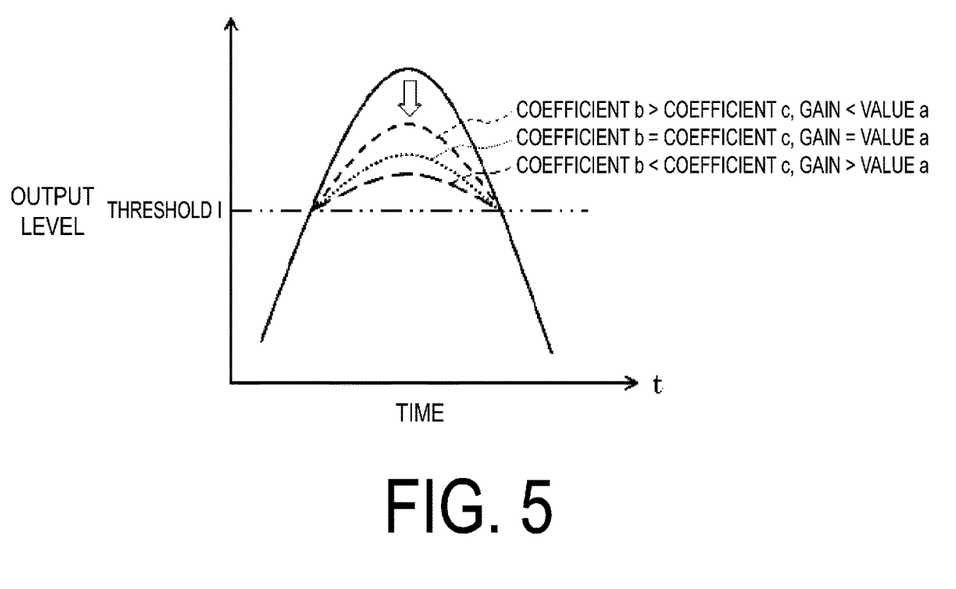
FIG. 5 is a diagram schematically illustrating a process by the compressor when a gain changes.

FIG. 5 is a diagram schematically illustrating a process by the compressor 112 when the gain changes. For example, defining the variable coefficient as a coefficient b, the compressor 112 sets the coefficient b when the gain for amplifying the receiving signal in the gain controller 111 is the value a as a coefficient c. As the gain becomes greater than the value a, the coefficient b is set to be smaller than the coefficient c, and as the gain becomes smaller than the value a, the coefficient b is set to be greater than the coefficient c. Here, when a percentage of a decrease in output level in the compression process is defined as compressibility, the compressibility increases as the coefficient decreases. That is, as the gain increases, the compressibility increases, and as the gain decreases, the compressibility decreases. As a result, even when a large voice signal is output from the gain controller 111, non-linear echoes can be reduced by reducing the peak of the voice signal by the compressor 112.

For example, the compressor 112 may change the compressibility based on information on the distortion of the speaker 52. Here, the information on the distortion of the speaker 52 is, for example, a total harmonic distortion factor (or a distortion factor) representing the degree of distortion of the signal. The total harmonic distortion factor indicates that the distortion of the speaker 52 is small when the value is small and the distortion of the speaker 52 is large when the value is large. Thus, the compressor 112 may increase the compressibility when the total harmonic distortion factor is large and decrease the compressibility as the total harmonic distortion factor decreases. As a result, with the use of the speaker 52 where distortion is likely to occur, reducing the peak of the voice signal by the compressor 112 allows reducing non-linear echoes.

Second Embodiment

The second embodiment of the present invention has a configuration in which an echo suppressor is provided. Now, an echo suppression device 2 according to the second embodiment will be described. The echo suppression device 2 is particularly suitable in a case where an external environment of an on-board device or the like possibly varies greatly. Note that the same components as those of the echo suppression device 1 according to the first embodiment are denoted by the same reference numerals, and description of the components will be omitted.

Figure 6:
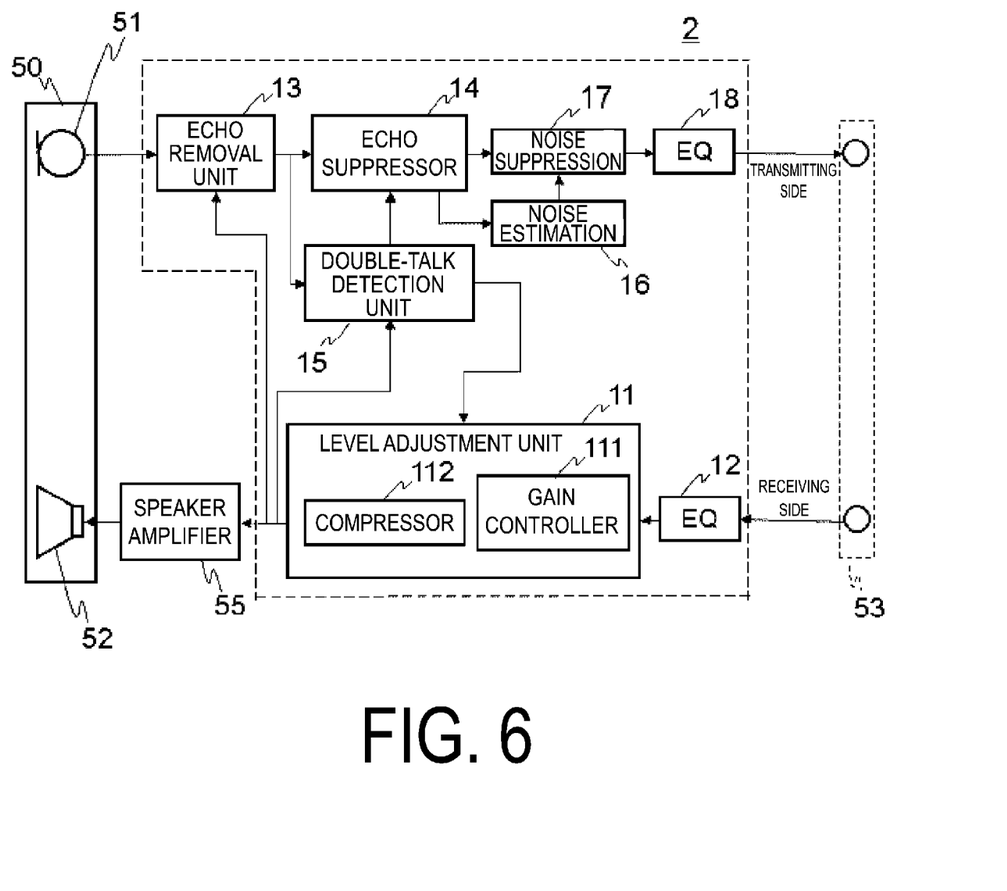
FIG. 6 is a block diagram illustrating a general configuration of an echo suppression device 2.

FIG. 6 is a block diagram illustrating a general configuration of the echo suppression device 2. The echo suppression device 2 primarily includes the level adjustment unit 11, an equalizer (EQ) 12, the echo removal unit 13, an echo suppressor 14, the double-talk detection unit 15, a noise estimation unit 16, a noise suppression unit 17, and an equalizer (EQ) 18.

The equalizers 12, 18 emphasize or reduce a particular frequency band of the voice signal. However, the equalizers 12, 18 are not essential.

The echo suppressor 14 performs a fast Fourier transform on the signal after the linear echo is cancelled by the echo removal unit 13, performs an echo suppressing process (a process for strongly suppressing echoes) on the signal after the Fast Fourier Transform is performed, and performs an inverse fast Fourier transform on the signal after the echo suppressing process is performed to remove the non-linear echo. The echo suppress processing is well known, and thus, detailed description of the processing is omitted.

In a case where the double-talk detection unit 15 detects that a signal is not transmitted through the transmitting signal path but a signal is transmitted through the receiving signal path, the echo suppressor 14 may perform a process of suppressing echoes on the signal from which the residual echo has been removed by the echo removal unit 13.

However, in the present embodiment, since the compressor 112 reduces non-linear echoes and the echo removal unit 13 sufficiently removes echo components, the echo suppressor 14 actually operates only when a sound volume of the speaker 52 is set to be large, for example, in a case where a voice level of an external noise is large and many non-linear echoes are generated.

Note that, in the present embodiment, the echo suppressor 14 performs frequency analysis using the Fast Fourier Transform, but instead of the Fast Fourier Transform, a Discrete Fourier Transform (DFT) can be used for the frequency analysis. In addition, the echo suppressor 14 may perform an inverse discrete Fourier transform, instead of the fast Fourier transform.

The noise estimation unit 16 estimates a noise component contained in an echo-removed signal converted into a function of a frequency domain by the echo suppressor 14, namely, an estimated noise signal, for each frequency region, and estimates a SN ratio of the echo-removed signal based on a power spectral density of the estimated noise signal, which has been estimated. The noise suppression unit 17 suppresses the noise signal in the echo-removed signal based on the power spectral density of the estimated noise signal estimated by the noise estimation unit 16 and generates a suppressed signal. Note that the noise estimation unit 16 and the noise suppression unit 17 are not essential.

According to the present embodiment, an echo component can be removed even in a case where many non-linear echoes are generated. For example, in an on-board device, the external environment possibly changes greatly by driving of a vehicle. When an external noise is large, the sound from the speaker 52 is difficult to hear. Therefore, it is necessary to increase the sound volume of the speaker 52 and increase a volume of a voice spoken by the user B on the far-end side, and as a result, linear echoes and non-linear echoes increase. The echo removal unit 13 can remove the linear echoes, but cannot remove the non-linear echoes. In the present embodiment, since the echo suppressor 14 is provided, even when many non-linear echoes are generated, the echo components can be removed.

Third Embodiment

The third embodiment has a configuration in which an operation of the compressor differs depending on each frequency band. Now, an echo suppression device 3 according to the third embodiment will be described. Note that the same components as those of the echo suppression device 1 according to the first embodiment are denoted by the same reference numerals, and description of the components will be omitted.

Figure 7:
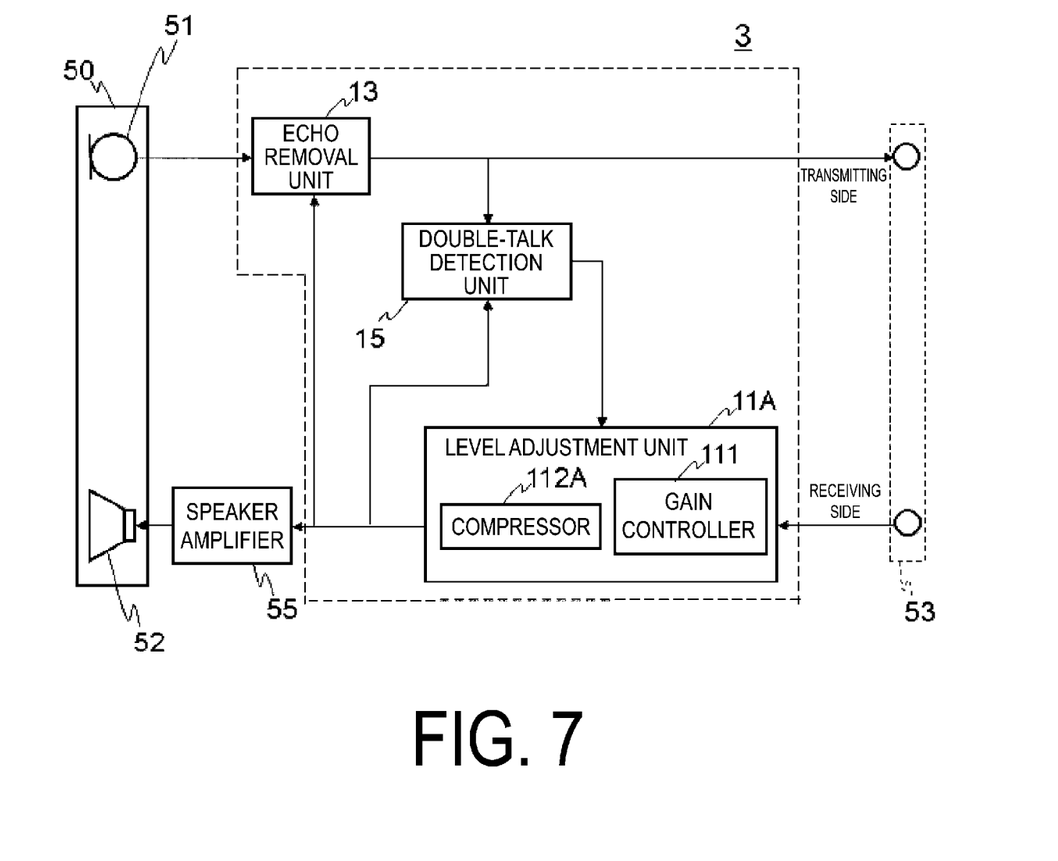
FIG. 7 is a block diagram illustrating a general configuration of an echo suppression device 3.

FIG. 7 is a block diagram illustrating a general configuration of the echo suppression device 3. The echo suppression device 3 primarily includes a level adjustment unit 11A, the echo removal unit 13, and the double-talk detection unit 15. The level adjustment unit 11A primarily includes the gain controller 111 and a compressor 112A.

The compressor 112A compares the voice level with a threshold for each frequency band, and performs a compression process on a receiving signal in a frequency band in which the voice level is greater than the threshold. The compressor 112A includes a processing unit that performs a Fourier transform and an inverse Fourier transform.

The compressor 112A performs the Fourier transform on the receiving signal to divide power that is an average energy per unit time into power for each frequency band, and calculates a power spectrum that expresses the power for each frequency band as a function of frequency for each unit time. The compressor 112A compares the value of the receiving signal with the threshold for each frequency band, and performs the compression process on a signal in a frequency band greater than or equal to the threshold.

Figure 8:
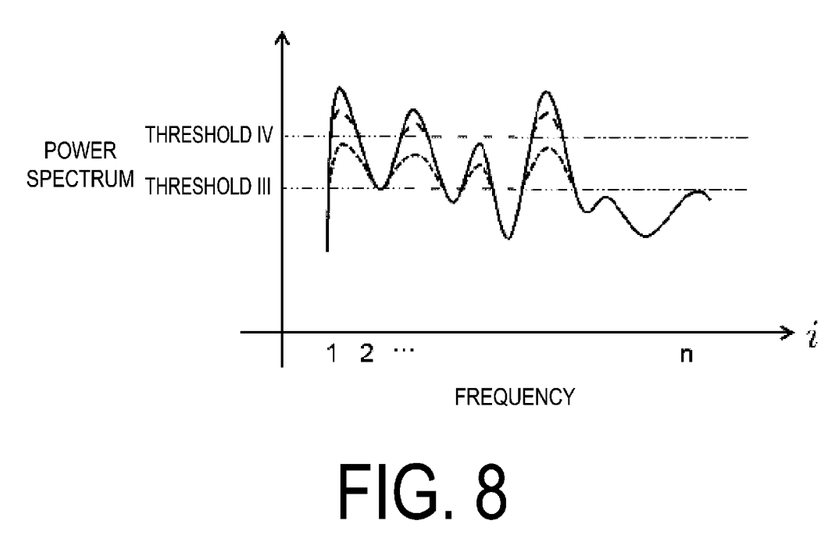
FIG. 8 is a diagram schematically illustrating a process by a compressor.

FIG. 8 is a diagram schematically illustrating a process by the compressor 112A. The solid line in FIG. 8 indicates the receiving signal. When the double-talk detection unit 15 has detected the double-talk state, the compressor 112A performs the compression process on a signal in a frequency band in which the value of the signal is greater than a threshold III. The dotted line in FIG. 8 indicates a signal after the compressor 112A performs the compression process on the signal greater than the threshold III. Furthermore, in a case where the double-talk detection unit 15 has not detected the double-talk state, the compressor 112A performs the compression process on a signal in a frequency band in which the value of the signal is greater than a threshold IV. The dashed line in FIG. 8 indicates a signal after the compressor 112A performs the compression process on the signal greater than the threshold IV. The threshold IV is greater than the threshold III.

The compressor 112A outputs a signal produced by performing an inverse Fourier transform on the signal after being compressed.

According to the present embodiment, by changing the presence or absence of the compression process for each frequency band, the proportion of the signals compressed by the compressor 112 is reduced to produce a further natural voice, and thus a telephone call quality can be improved.

Note that in the present embodiment, while the compressor 112A performs the compression process on the signal in the frequency band greater than the threshold III or the threshold IV, not depending on the frequency band, the threshold may be changed depending on the frequency band. For example, a voice component at a low frequency is likely to cause a distortion, and therefore, the threshold may be decreased as the frequency becomes low, and the threshold may be increased as the frequency becomes high.

The embodiments of the invention are described above in detail with reference to the drawings. However, specific configurations are not limited to the embodiments and also include changes in design or the like without departing from the gist of the invention.

REFERENCE SIGNS LIST 1, 2, 3 Echo suppression device
11, 11A Level adjustment unit
12 Equalizer
13 Echo removal unit
14 Echo suppressor
15 Double-talk detection unit
16 Noise estimation unit
17 Noise suppression unit
18 Equalizer
50 Terminal
51 Microphone
52 Speaker
53 Cell phone
54 Cell phone
55 Speaker amplifier
100 Voice communication system
111 Gain controller
112, 112A: Compressor

The invention claimed is:
1. An echo suppression device for suppressing an echo generated by inputting a voice signal output from a speaker to a microphone, the echo suppression device comprising:
a level adjustment unit provided on a receiving signal path for transmitting a signal of receiving signals from a far-end side to the speaker;
an echo removal unit provided on a transmitting signal path for transmitting a signal input from the microphone, the echo removal unit removing a residual echo from a picked-up sound signal output from the microphone; and a double-talk detection unit that detects whether signals are in a double-talk state in which the signals are simultaneously transmitted to the transmitting signal path and the receiving signal path, wherein the level adjustment unit includes a compressor, which, when the double-talk detection unit has detected the double-talk state, performs a compression process on a signal greater than a first threshold among the receiving signals.

2. The echo suppression device according to claim 1, wherein when the double-talk detection unit has not detected the double-talk state, the compressor performs the compression process on a signal greater than a second threshold greater than the first threshold among the receiving signals.

3. The echo suppression device according to claim 1, wherein the level adjustment unit includes a gain adjustment unit that adjusts a gain of the receiving signals, and the compressor adjusts a threshold so that the first threshold becomes smaller as the gain increases, to performs a process on a signal output from the gain adjustment unit.

4. The echo suppression device according to claim 3, wherein the compressor increases compressibility as the gain increases.

5. The echo suppression device according to claim 1, wherein the compressor changes compressibility based on information on a distortion of the speaker.

6. The echo suppression device according to claim 1, further comprising an echo suppressor that performs a process to suppress an echo on a signal from which the residual echo has been removed by the echo removal unit.

7. The echo suppression device according to claim 1, wherein the compressor compares a value of the receiving signal with a third threshold for each frequency band, and when the double-talk detection unit has detected the double-talk state, the compressor performs the compression process on a signal of the receiving signal having a value greater than the third threshold.

8. An echo suppression method for suppressing an echo in a near-end terminal including a speaker and a microphone, the echo suppression method comprising:

detecting whether signals are in a double-talk state in which the signals are simultaneously transmitted to a transmitting signal path for transmitting a signal input from the microphone and a receiving signal path for transmitting a signal to the speaker;

performing a compression process on a signal greater than a first threshold among receiving signals from a far-end side when the double-talk state has been detected;

outputting a signal after the compression process from the speaker; and removing a residual echo from a picked-up sound signal output from the microphone.

9. A non-transitory computer readable storage medium having a stored program causing a computer to suppress an echo in a near-end terminal having a speaker and a microphone, the stored program causing the computer to:

detect whether signals are in a double-talk state in which the signals are simultaneously transmitted to a transmitting signal path for transmitting a signal input from the microphone and a receiving signal path for transmitting a signal to the speaker;

perform a compression process on a signal greater than a first threshold among receiving signals from a far-end side when the double-talk state has been detected;

output a signal after the compression process from the speaker; and remove a residual echo from a picked-up sound signal output from the microphone.

* * * * *